United States Patent [19]

Pischlinger

[11] 4,385,725
[45] May 31, 1983

[54] HEAT PUMP ASSEMBLY

[75] Inventor: Franz Pischlinger, Aachen, Fed. Rep. of Germany

[73] Assignee: Klockner-Humboldt-Deutz AG, Cologne, Fed. Rep. of Germany

[21] Appl. No.: 236,635

[22] Filed: Feb. 20, 1981

[30] Foreign Application Priority Data

Feb. 23, 1980 [DE] Fed. Rep. of Germany ....... 3006821

[51] Int. Cl.³ .......................... B60H 1/02; F24D 1/04
[52] U.S. Cl. ...................................... 237/12.1; 122/26; 122/247; 237/2 B
[58] Field of Search ...................... 122/26, 247, 20 B; 237/12.1, 2 B

[56] References Cited

U.S. PATENT DOCUMENTS 2,312,996  3/1943  Bethendo ............................ 126/247
4,264,826  4/1981  Ullmann ............................... 122/26
4,293,092  10/1981  Hatz et al. ........................... 126/247

FOREIGN PATENT DOCUMENTS 2916870  11/1980  Fed. Rep. of Germany .
983189  2/1965  United Kingdom .

Primary Examiner—William R. Cline
Assistant Examiner—John F. McNally
Attorney, Agent, or Firm—Watson, Cole, Grindle & Watson

[57] ABSTRACT

A heat pump assembly comprises a refrigeration circuit including an evaporator, a compressor and a capacitor, and an internal combustion engine for driving the compressor and being coupled therewith by a detachable coupling. A heating circuit is disposed in communication with the capacitor and includes a space heat exchanger for the heating of space by heat absorbed from the capacitor, and further includes the engine, a heat exchanger in a communication with an exhaust pipe extending from the engine, and a retarder driven by the engine for the torque loading of same. Space is thus further heated by the engine and the emissions therefrom, and the retarder comprises an electric braking arrangement by which energy to be dissipated is converted into heat by eddy currents produced in a solid conductor.

4 Claims, 2 Drawing Figures

HEAT PUMP ASSEMBLY

BACKGROUND OF THE INVENTION

This invention relates to a heat pump assembly comprising a refrigeration circuit including a condenser, a compressor and an evaporator, and further comprising a heating circuit in communication with the condenser and including a space heat exchanger for the heating of space by heat absorbed from the capacitor. The heating circuit further includes the internal combustion engine, a heat exchanger in communication with an exhaust pipe extending from the engine, and a retarder driven by the engine for the torque loading of same, the space being thereby further heated by the engine and the emissions therefrom.

Generally, heat pump assemblies which operate with compressors driven by internal combustion engines, are known in the art. If outside or ambient air is utilized as the heat source for the heat pump, the total heat required for the space to be heated, such as a house, even when the temperature of the outside air is extremely low (e.g., −15° C.), can be delivered only if the refrigerant compressor is geared to accommodate such low outside air temperature. Consequently, for those outside air temperature ranges which prevail most of the time, the capacity of the compressor is too high so that even if the rotational speed of the compressor is reduced, an on-off control must be employed for fairly high outside temperatures in order to run the compressor at the low capacity required. However, an on-off control results in standstill and starting losses and moreover, reduces the service life of the compressor and of the internal combustion engine.

Therefore, it is advisable to properly gear the refrigerant compressor to the outside temperature range which prevails most of the time. This is achieved by installing an auxiliary heating system to accommodate the occurences of extremely low outside temperatures. However, such a system requires considerable capital outlay which may remain unused for a large portion of the heating period.

In German published application No. 27 28 273, this problem is overcome by gearing the capacity of the compressor to the annual operating range which is used most of the time, and by feeding the dissipated heat of the internal combustion engine to the heating circuit. Within the range of low outside temperatures, an auxiliary unit, such as a fluid brake or a generator loaded with heat resistors, is switched on for loading the internal combustion engine. Thus, the engine operates at a high power loss creating heat which can be transferred to the heating circuit, and the fluid brake or heat resistors form supplementary sources of heat to warm up the heating circuit.

However, the drawbacks in the use of such a fluid brake include its mechanical sensitivity as well as the dependence of its performance on the properties of the fluid employed in a useful circuit. This interferes with adequate adjustability, which can be achieved only with a cost-intensive system. And, the use of a resistor-loaded generator requires complex and expensive switchgear in the electric circuit for the gradual or continuous regulation of the load.

SUMMARY OF THE INVENTION

It is therefore an object of the present invention to provide a heat pump assembly of the general class described but which has an adequate adjustability which can be effected with minimal technical effort.

This general objective is achieved by the provision of an eddy-current retarder as a braking unit wherein energy to be dissipated is converted into heat by eddy currents produced in a solid conductor. Eddy-current retarders have the advantage that through simple control of the excitation current the desired instantaneous braking power can be set. Moreover, the eddy-current retarder operates without mechanical control elements, is fully resistant to wear and is maintenance free. Furthermore, the fluid employed to transfer the heat does not rely on the principles of fluid mechanics.

Since the eddy-current retarder produces a braking torque only if its magnetic field is switched on, such that if excitation is not applied it can be driven by the internal combustion engine nearly without loss of power, the eddy-current retarder according to the invention can be driven directly by the internal combustion engine without the use of a coupling. Thus, a coupling, which is otherwise necessary in auxiliary heating equipment of known construction, can be dispensed with.

If the eddy-current retarder is mounted in a separate housing which is flange-mounted to the housing of the internal combustion engine, a very compact apparatus is obtained which is easy to repair. This form of construction also has the advantage that the crankcase of the internal combustion engine need not be altered.

The eddy-current retarder has a flywheel or rotor which may be mounted on the crankshaft of the internal combustion engine, thereby rendering it unnecessary to provide a mounting for the flywheel, so that the entire apparatus becomes less expensive and is simpler to construct.

Use of the eddy-current retarder as auxiliary heating equipment has the further advantage that it can be disposed directly in the heating circuit since its stator contains refrigeration passages which are in communication with the heating circuit. Also, the engine housing may have fluid passages in communication with the fluid passages of the stator and with the heating circuit. Thus, a separate heat exchanger and a heating medium circuit for the eddy-current retarder, can be eliminated.

The magnetic field of the eddy-current retarder can be controlled by a governing system powered by an outside electrical power source so that commercial, weatherproof temperature sensors may be employed for such governing system. Such sensors control the excitation current by means of a suitable, commercially available final controlling element instead of an engine driven four-way valve as required for the prior art fluid brake. Thus, proven commercial components are available for control of the auxiliary heating equipment according to the invention. These sensors are provided for respectively sensing the temperatures of the engine, the space to be heated, the ambient air and the heating circuit, to thereby function as input variables to the governing system which may be in the form of a single governor performing all the necessary control functions.

The internal combustion engine may be equipped with a variable-speed governor which may likewise be controlled by the governing system, so that a fully automatic closed-looped control is effected depending on the exterior temperature, the engine temperature and the heating circuit temperature, as well as the temperature of the space to be heated.

Other objects, advantages and novel features of the invention will become more apparent from the following detailed description of the invention when taken in conjunction with the accompanying drawings.

DETAILED DESCRIPTION OF THE INVENTION

Figure 1:
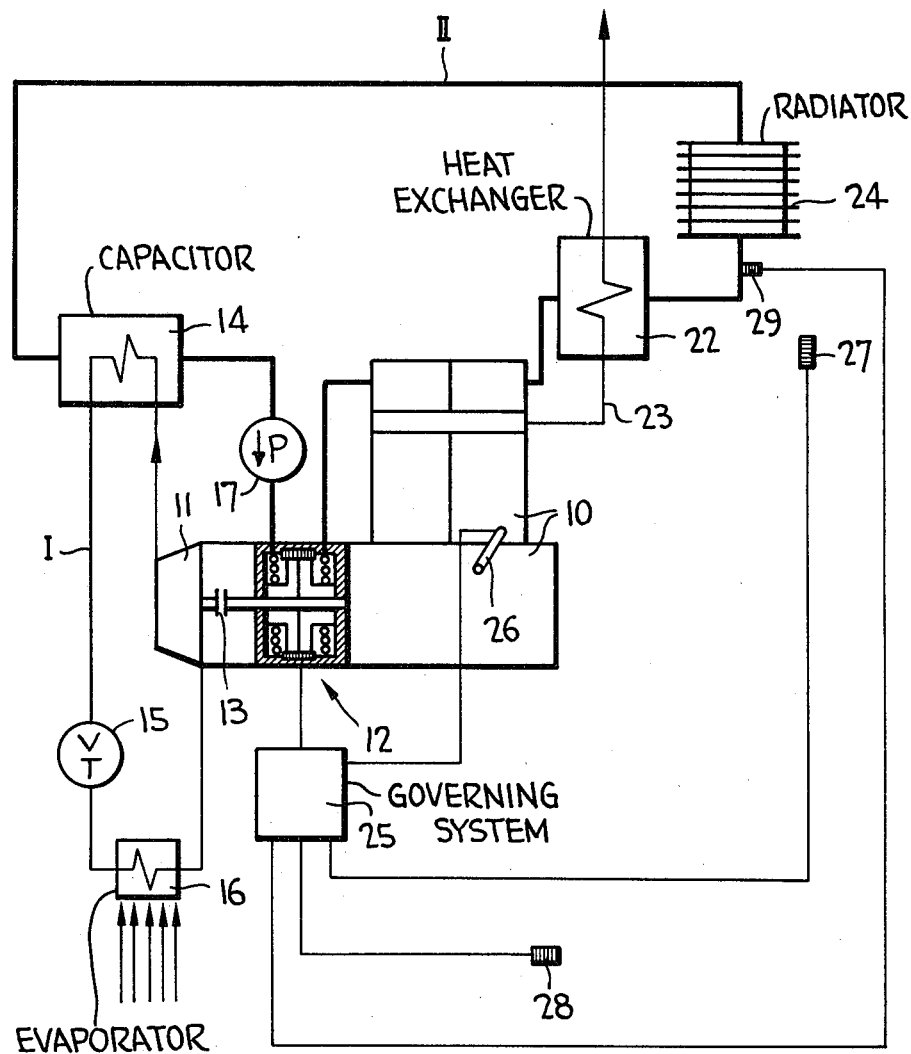
FIG. 1 is a diagrammatic sketch of a heat pump system embodying the principles of the invention.

Turning now to the drawings wherein like reference characters refer to like and corresponding parts throughout the several views, an internal combustion engine 10 drives a refrigerant compressor 11 as well as an eddy-current retarder 12, which are mounted at opposite ends of its crankshaft. The compressor is mounted via a detachable coupling 13, and the retarder is directly connected to the engine without the use of a coupling.

A refrigeration circuit I of known construction includes compressor 11, a condenser 14, a throttle or expansion valve 15 and a low-pressure low-temperature evaporator 16. In a conventional manner, heat is taken in the evaporator from the surroundings or from ground water and supplied to the refrigerant, which is in a liquid phase first. The compressor takes refrigerant vapor from the evaporator, compresses it and delivers it at high pressure and temperature to condenser 14. In the condenser the refrigerant transfers the heat absorbed from the surroundings and augmented by the energy fed by the compressor, to a heating circuit II. In the process, the refrigerant is reconverted into the liquid phase. By expansion in valve 15, the refrigerant is returned to its initial phase as it existed prior to the evaporator.

Water is normally employed as the heat carrier in heating circuit II. The water is circulated by a circulation pump 17 through refrigeration passages 18 (FIG. 2) provided in the eddy-current retarder, through passages 19 provided in housing 21 of the internal combustion engine and in communication with passages 18, and from there to an exhaust gas heat exchanger 22 which communicates with an exhaust pipe 23 extending from the engine. The water in the heating circuit circulates through heat exchanger 24 (shown as a radiator in FIG. 1) and from there back to the circulation pump via condenser 14 from which it absorbs heat from refrigeration circuit I. Thus, additional heat is made available for the space to be heated by the heat of the internal combustion engine and the emissions therefrom. And, the engine and exhausts are consequently cooled.

The energization of eddy-current retarder 12, the speed and load adjustments of internal combustion engine 10, as well as the operation of a four-way valve (not shown) which may be disposed in heating circuit II for operation of the heating circuit, are carried out by a governing system 25. Such a system, of some suitable type, is powered by an outside electrical power source generally designated S in FIG. 2. And, input variables are provided to the governing system by sensors 26, 27, 28 and 29 which respectively sense the temperatures of the engine, the space to be heated, the ambient air and the heating circuit, to thereby influence the operation of the governing system.

Figure 2:
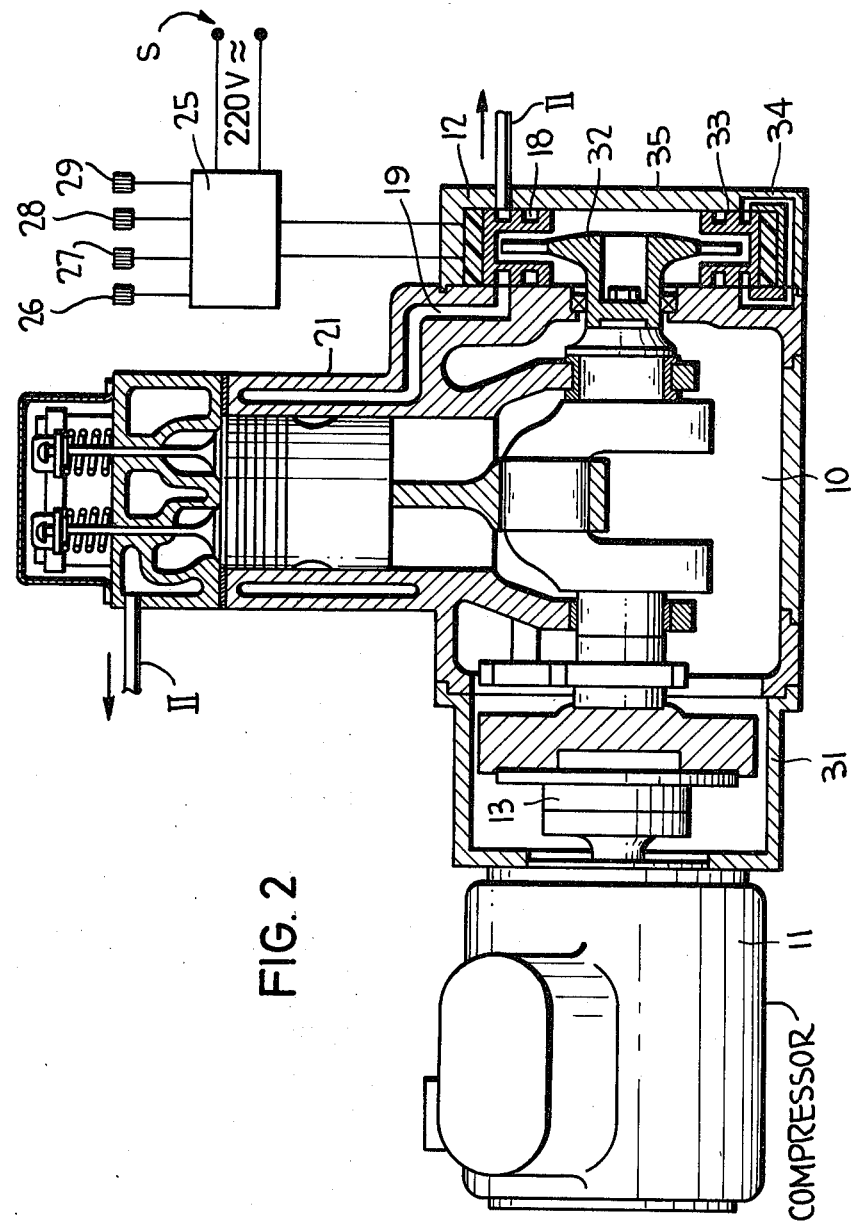
FIG. 2 is a sectional view of the internal combustion engine with the flange-mounted eddy-current retarder and compressor, as a part of the FIG. 1 heat pump system.

In FIG. 2, detachable coupling 13 is shown housed in a housing 31 which is flange-mounted on to engine housing 21, and compressor 11 is mounted on housing 31 and is driven by the engine via the coupling. The eddy-current retarder is mounted at the other end of the engine, and includes a flywheel 32 defining a rotor connected directly to an end of the engine crankshaft thereby eliminating the need of a special mounting or coupling whereby substantially wear-free operation of the retarder is made possible. Flywheel 32 rotates in an air gap of a stator 33 which is magnetizable by a coil 34. And, the retarder is disposed within a housing 35 which is flange-mounted to housing 21.

The heat pump assembly according to the invention is designed such that, when the internal combustion engine reaches its maximum rotational speed, sufficient heat is available in the ambient air above approximately $-4°$ C. to heat the space to be heated using the waste heat of the condenser and the heat of the internal combustion engine alone. At higher outside temperatures, the heat capacity is adjusted to the heat consumption through adjustment of the load and of the rotational speed of the internal combustion engine. At still higher temperatures, provision is made for adjustment of the heating capacity by a fixed-cycle on-off operation.

When the outside temperatures are below the equilibrium point of $-4°$ C., the engine invariably runs at maximum full-load speed and is at the same time also torque loaded by the eddy-current retarder. The intensity of the excitation current and, thus, the amount of braking torque, is adjusted by means of governing system 25, the engine speed being maintained constant through regulation of the quantity of fuel injected via a variable-speed governor (not shown) of a fuel-injection pump (also not shown).

Also, the heat pump assembly according to the invention may readily accommodate a heating emergency operation in the event of a breakdown of refrigeration circuit I. In such instance, the compressor is disconnected via coupling 13 and heat is applied to heating circuit II only through the eddy-current retarder and the engine waste heat.

By appropriate design of the eddy-current retarder of the invention, up to 90% of the fuel energy can be converted into calorific heat when the internal combustion engine is operating at full load.

Obviously, many modifications and variations of the present invention are made possible in the light of the above teachings. It is therefore to be understood that within the scope of the appended claims the invention may be practiced otherwise than as specifically described.

What is claimed is:

1. A heat pump arrangement comprising, a refrigeration circuit including a compressor and a condensor, a heating circuit including a heating medium and an internal combustion engine for driving said compressor through a detachable coupling, said heating circuit being in heat exchange communication with said refrigeration circuit through said condensor, for cooling said engine and exhaust gas thereof, said heating circuit also including a braking aggregate directly driven by said engine, said braking aggregate comprising an eddy-current retarder which is directly driven by said engine, a separately powered governing system is provided for controlling the excitation of said eddy-current retarder, said retarder including a rotor mounted on the crankshaft of said engine and further including a stator having heating medium passages which are connected to cooling passages of said engine located in the engine casing, said heating medium passages and said cooling passages being directly connected into said heating circuit whereby the heating medium of said heating circuit flows therethrough.

2. The arrangement according to claim 1, wherein a separate retarder casing houses said retarder and is flange mounted to said engine casing.

3. The arrangement according to claim 1, wherein sensors are provided as input variables to said governing system, said sensors being capable of sensing the temperature of said engine, the space to be heated, the ambient air and said heating circuit.

4. The arrangement according to claim 3, wherein said governing system also controls the speed and load requirements of said engine.

* * * * *